United States Patent
Boeke (10) Patent No.: US 9,048,692 B2
(45) Date of Patent: Jun. 2, 2015

(54) CONTROLLED CONVERTER ARCHITECTURE WITH PRIORITIZED ELECTRICITY SUPPLY

(75) Inventor: Ulrich Boeke, Langerwehe (DE)

(73) Assignee: Koninklijkle Philips N.V., Eindhoven (NL)

( * ) Notice: Subject to any disclaimer, the term of this patent is extended or adjusted under 35 U.S.C. 154(b) by 0 days.

(21) Appl. No.: 14/111,883

(22) PCT Filed: Apr. 20, 2012

(86) PCT No.: PCT/IB2012/052002
§ 371 (c)(1),
(2), (4) Date: Nov. 8, 2013

(87) PCT Pub. No.: WO2012/143904
PCT Pub. Date: Oct. 26, 2012

(65) Prior Publication Data
US 2014/0132169 A1    May 15, 2014

(30) Foreign Application Priority Data

Apr. 20, 2011  (EP) .................................... 11163121

(51) Int. Cl.
*H05B 37/02*  (2006.01)
*H02J 3/38*  (2006.01)
*H02J 1/10*  (2006.01)
*H02J 3/46*  (2006.01)
(Continued)

(52) U.S. Cl.
CPC . *H02J 3/38* (2013.01); *H02J 1/102* (2013.01); *H02J 3/385* (2013.01); *H02J 3/46* (2013.01); *H02J 5/00* (2013.01); *Y02E 10/58* (2013.01); *H05B 33/0815* (2013.01); *H05B 33/0896* (2013.01)

(58) Field of Classification Search
USPC ............ 315/86, 201, 246, 250, 294, 299, 307
See application file for complete search history.

(56) References Cited

U.S. PATENT DOCUMENTS

| | | | |
|---|---|---|---|
| 7,564,193 B2 * | 7/2009 | Lyle et al. ..................... | 315/276 |
| 2005/0162018 A1 | 7/2005 | Realmuto | |
| 2008/0265847 A1 * | 10/2008 | Woo et al. ..................... | 323/206 |

(Continued)

FOREIGN PATENT DOCUMENTS

| | | |
|---|---|---|
| EP | 2224571 A1 | 9/2010 |
| JP | 2010041819 A | 2/2010 |

(Continued)

OTHER PUBLICATIONS

Florent Boico et al; "Solar battery chargers for NIMH batteries", IEEE Transactions on Power Electronics, vol. 22, No. 5, Sep. 2007, pp. 1600-1609.

*Primary Examiner* — Tung X Le
(74) *Attorney, Agent, or Firm* — Meenakshy Chakravorty (57) ABSTRACT

The present invention relates to a power converter architecture and its operation principle that supplies an electric load with a controlled direct voltage from both a local direct current electricity source as well as an alternating current (AC) mains with maximum power conversion efficiency. For the case that the local electricity source can not provide enough electricity to the local load it is additionally supplied with electricity from the AC mains. In other case electricity is also feed into the AC grid when a local source can provide more electricity than needed to supply local loads.

13 Claims, 3 Drawing Sheets

(51) Int. Cl.
*H02J 5/00* (2006.01)
*H05B 33/08* (2006.01)

(56) References Cited

U.S. PATENT DOCUMENTS

2009/0179499 A1    7/2009  Realmuto et al.
2010/0182803 A1*   7/2010  Nan et al. ................... 363/21.02
2010/0201285 A1*   8/2010  Dellian et al. ................ 315/294
2011/0121756 A1*   5/2011  Thomas et al. ............... 315/294

FOREIGN PATENT DOCUMENTS

WO    2008015461  A1    2/2008
WO    2009155445  A2   12/2009

* cited by examiner

PRIOR ART

CONTROLLED CONVERTER ARCHITECTURE WITH PRIORITIZED ELECTRICITY SUPPLY

FIELD OF THE INVENTION

The invention relates to an apparatus and method for controlling operation of converters to achieve prioritized electricity supply.

BACKGROUND OF THE INVENTION

With ever-increasing demand for "green" energy, solar power has drawn a lot of attention by its rapid growth in recent years. To convert the fluctuating direct current (DC) output voltage from solar modules into a well-regulated sinusoidal alternating current (AC) voltage, the architecture of a typical solar power conversion system is either two-stage or single-stage, with or without, DC/DC converter. The existence of a DC/DC stage can maintain the input voltage of an inverter at a constant and controlled level, and decouple the control of voltage and power flow. The inverter transforms DC power from the photovoltaic array (PV) array to grid-quality AC power. Depending upon the system architecture, the inverter may also charge and discharge energy storage, and may control smart loads, e.g. smart appliances, especially in residential systems. The inverter/controller, if it contains adaptive logic, may also determine when excess energy is dispatched to the grid or stored.

Some design goals for inverter topologies are maximum power point (MPP) tracking of the solar panel for detection of the input voltage with the maximum input power, and maximum energy efficiency for the inverter. In order to run the inverter at the MPP, the circuit has to be able to adjust the input voltage according to the current light conditions. The MPP is usually at approximately 70% of the open loop voltage, but this is also dependent on the selected panel technology. To achieve this, the input voltage can be adjusted dynamically, for example with a boost circuit. In a 2nd stage, the DC-voltage can be inverted into a sinusoidal grid-compatible voltage. The booster adjusts the input voltage to the MPP. The output inverter injects the sinusoidal output current into the power grid.

Florent Boico et. al: "Solar battery chargers for NiMH batteries", IEEE transactions on power electronics, Vol. 22, No. 5, September 2007, discloses new voltage and temperature-based charge control techniques. To increase charge speed, an MPP tracker (MPPT) is implemented within a micro-controller using a Sepic converter and a bypass switch. The Sepic topology was used because it offers common ground between the input and output and continuous current at the input. The bypass switch is controlled by the microcontroller. MPP is achieved by adjusting a DC/DC converter control loop, When the algorithm has stabilized around the MPP, the micro-controller assesses whether MPPT increases delivered power or not. This is done by switching to direct connection and comparing the charging current delivered to the battery. The best solution will be retained. After a predetermined time period, the two possibilities (direct connection or MPPT) are tried again in case the MPP of the solar panel changed due to light intensity or temperature.

SUMMARY OF THE INVENTION

It is an object of the present invention to provide an improved power converter system capable of supplying an electrical load with a controlled DC voltage from both a local DC source as well as an AC mains, with maximum power conversion efficiency.

This object is achieved by an apparatus as claimed in claim 1, by a converter system as claimed in claim 9, by a chip device as claimed in claim 10 or 11, by a method as claimed in claim 12, and by a computer program product as claimed in claim 13.

Accordingly, the proposed power conversion solution comprises of a bi-directional AC/DC conversion/converter supplied by AC mains, and a DC/DC up conversion/converter supplied by a local (non-linear) DC source, which together supply a DC/DC down conversion/converter connected to the load. The operation of these three power conversions/converters is controlled as a function of predetermined measured electrical parameters. Priority will be to supply the load from the local (non-linear) DC source operating in its maximum power point, wherein one of the two DC/DC conversions/converters will be controlled so as to provide its input directly to its output without energy conversion to maximize energy efficiency of the proposed power conversion. Furthermore, the bi-directional AC/DC conversion/converter may thus be controlled to keep harmonic distortion at mains to a low value.

According to a first aspect, the controller may be adapted to control the first and second DC/DC converters and the AC/DC converter to provide at least one of the following control functions:

operation of said DC electricity source in its maximum power point;
control of a regulated voltage to supply the electric load with direct current; and
generation of a sinusoidal time function of an input current to the AC power supply.

Thereby, the proposed converter system and method can be used to provide a combined functionality of supplying an additional load with a regulated DC voltage and operating the AC/DC converter either as rectifier or as inverter depending on the available power of the non-linear DC electricity source.

According to a second aspect which can be combined with the above first aspect, the controller may be adapted to set the power converter system into a first operation mode if it detects based on the measured electrical parameters that a power level at the output of the first DC/DC converter is higher than a power level at the input of the second DC/DC converter and that the output voltage of the first DC/DC converter is substantially equal to the output voltage at the electric load, and wherein during the first operation mode the controller is adapted to control the first DC/DC converter so as to load the DC electricity source to generate maximum output power, to control the second DC/DC converter so as to conduct its input directly to its output without energy conversion, and to control the AC/DC converter so as to operate as an inverter. Thus, two electricity loads can be supplied with energy from one electricity source.

According to a third aspect which can be combined with at least one of the above first and second aspects, the controller may be adapted to set the power converter system into a second operation mode if it detects based on the measured electrical parameters that a power level at the output of the first DC/DC converter is higher than a power level at the input of the second DC/DC converter and that an output voltage of the first DC/DC converter is higher than an output voltage at the electric load, and wherein during the second operation mode the controller is adapted to control the first DC/DC converter so as to conduct its input directly to its output without energy conversion, to control the second DC/DC converter so as to down-convert the output voltage of the DC electricity source into the output voltage at the electric load, and to control the AC/DC converter so as to operate as an inverter. Thus, again, two electricity loads can be supplied with energy from one electricity source.

According to a fourth aspect which can be combined with at least one of the above first to third aspects, the controller may be adapted to set the power converter system into a third operation mode if it detects based on the measured electrical parameters that a power level at the output of the first DC/DC converter is lower than a power level at the input of the second DC/DC converter and that an output voltage of the first DC/DC converter is substantially equal to an output voltage at the electric load, and wherein during the third operation mode the controller is adapted to control the first DC/DC converter so as to load the DC electricity source to generate maximum output power, to control the second DC/DC converter so as to conduct its input directly to its output without energy conversion, and to control the AC/DC converter so as to operate as a rectifier. Thus, here, one electricity load can be supplied with energy from two electricity sources.

According to a fifth aspect which can be combined with at least one of the above first to fourth aspects, the controller may be adapted to set the power converter system into a fourth operation mode if it detects based on the measured electrical parameters that a power level supplied by the DC electricity source is lower than a power level required at the electric load and that an output voltage of the first DC/DC converter is higher than the output voltage at the electric load, and wherein during the fourth operation mode the controller is adapted to control the first DC/DC converter so as to conduct its input directly to its output without energy conversion, to control the second DC/DC converter so as to generate a regulated output voltage at the electric load, and to control the AC/DC converter so as to operate as a rectifier. Thus, again, one electricity load can be supplied with energy from two electricity sources.

According to a sixth aspect which can be combined with at least one of the above first to fifth aspects, the measured electrical parameters may comprise an output voltage and an output current of the first DC/DC converter, an input current and an output voltage of the second DC/DC converter, and an input current of the AC/DC converter. Thereby, the above control functions can be achieved by simple measurements within the connections of the converter system.

According to a seventh aspect which can be combined with at least one of the above first to sixth aspects, the electric load may comprise at least one of a light emitting diode, an organic light emitting diode, and electric appliances in buildings. Hence, an improved power converter system with prioritized electricity supply can be provided.

In a further aspect of the present invention, a computer program for controlling power conversion is provided, wherein the computer program comprises code means for causing the power conversion apparatus to carry out the steps of the above method, when the computer program is run on a computer controlling the load monitoring apparatus.

The above apparatus and converter system may be implemented as a hardware circuit, single chip or chip set which can be mounted to a circuit board. The chip or chip set may comprises a processor which is controlled by program or software routine.

It shall be understood that embodiments of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

The following embodiment is related to an improved conversion system for controlling operation of converters to achieve prioritized electricity supply with maximum efficiency.

Figure 1:
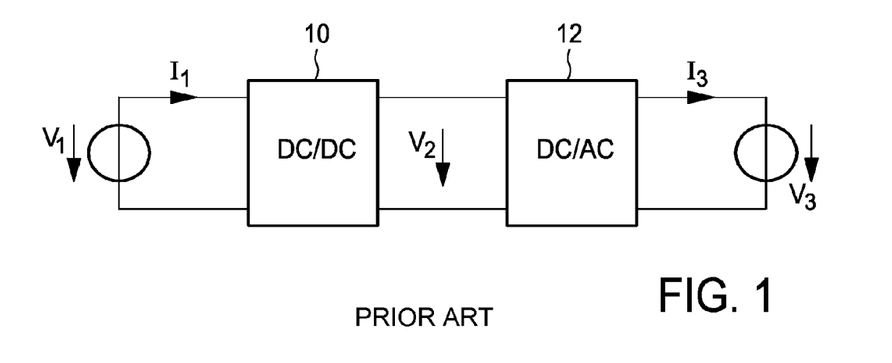
FIG. 1 shows a schematic block diagram of a conventional solar converter system.

The description starts with a conventional converter architecture of grid-connected solar systems, as depicted in FIG. 1, which is improved by the proposed architecture as described later. A string of photovoltaic modules forms a non-linear electricity source and generates a DC voltage $V_1$ that is connected to an input of a DC/DC converter 10. The DC/DC converter 10 is controlled such that the non-linear electricity source operates in its maximum power point (MPP) and thus generates a maximum output power $P_1=V_1 \times I_1$. The DC/DC converter 10 generates a DC output voltage $V_2$ that is the input voltage of a DC/AC converter (or DC/AC inventor) 12 that feeds the electricity into an AC mains or power grid with an AC voltage $V_3$. A topology of the DC/DC converter 10 may be a boost converter. The DC/AC inverter 12 may be a full-bridge inverter connected with a single-phase mains voltage or a B6-bridge inverter connected with a three-phase mains voltage.

Figure 2:
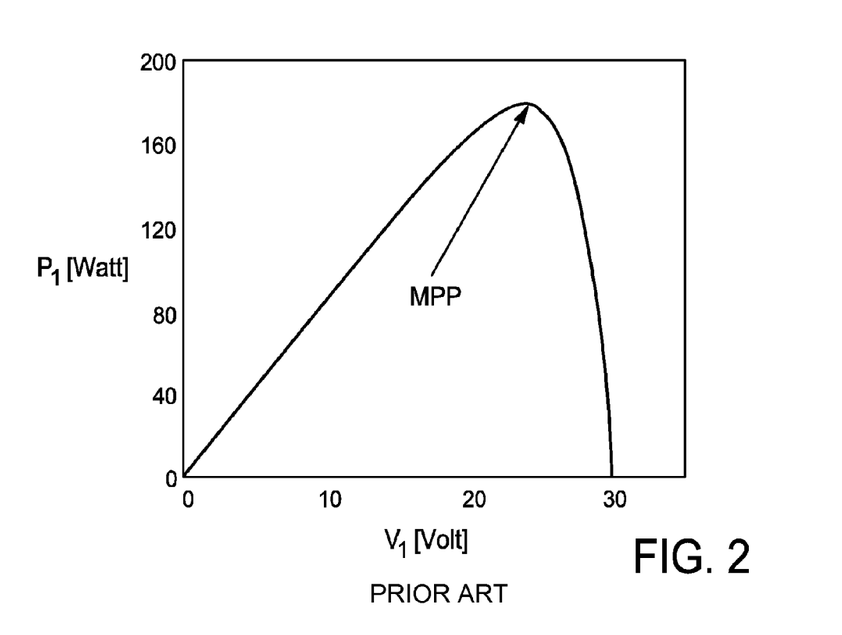
FIG. 2 shows a non-linear characteristic of an output power of a photovoltaic module as a function of the output voltage.

FIG. 2 shows the non-linear characteristic of an output power of a PV cell or module as a function of the output voltage $V_1$. Other non-linear electricity sources are wind power systems and fuel cells, for example. The PV module may be operated over a range of voltages and currents. By varying the load resistance from zero (i.e. short circuit) to infinity (i.e. open circuit), the highest efficiency can be determined as the point at which the module delivers maximum power. This MPP occurs where the product of current times voltage is at its maximum value. No power is produced at short-circuit current with no voltage or at open-circuit voltage with no current. Hence, the maximum power generated is expected to be somewhere between these two points at only one place on the power curve, at about the "knee" of the I-V curve (not shown). This point represents the maximum efficiency of the PV module at converting sunlight into electricity.

Figure 3:
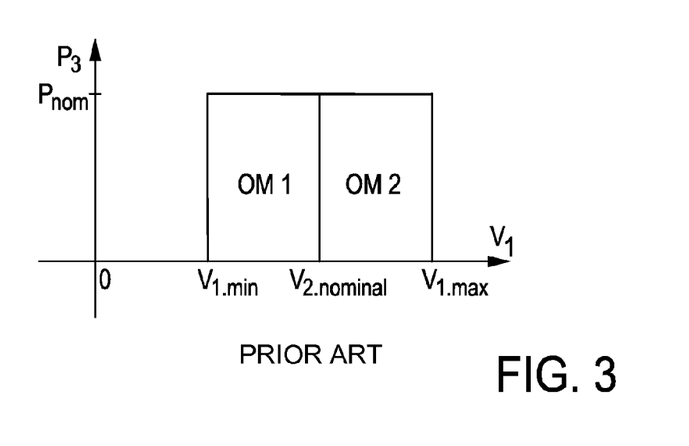
FIG. 3 shows a diagram indicating two operation modes in a state plane of a conventional solar converter system.

FIG. 3 shows a diagram indicating two operation modes of the conventional converter of FIG. 1 in a state plane of a conventional solar converter system The operation can be split into a first operation modes (OM1) and a second operation mode (OM2) to maximize power conversion efficiency. The DC/DC (boost) converter 10 is boosting energy from its input voltage $V_1$ to a higher output voltage $V_2$ if $V_1$ is lower than the required nominal input voltage $V_{2,nominal}$ of the DC/AC converter 12, which corresponds to the first operation mode in FIG. 3.

In the second operation mode, the DC/DC converter 10 is conducting its input voltage directly to its output, i.e. $V_1=V_2$, without any energy conversion to maximize the power conversion efficiency. The second operation mode is used if $V_1$ in the maximum power point (MPP) is larger than the minimum required DC input voltage of the DC/AC inverter 12, i.e. $V_1 \geq V_{2,nominal}$.

The converter system has two control functions. First, the MPP control is realized in the second operation mode with the DC/AC converter 12. Or the MPP control is realized in the first operation mode with the DC/DC converter 10. Second, the DC/AC converter 12 is converting its DC input current $I_2$ into a regulated AC output current $I_3$.

In the following, the proposed converter system or architecture according to the embodiment is described.

Figure 4:
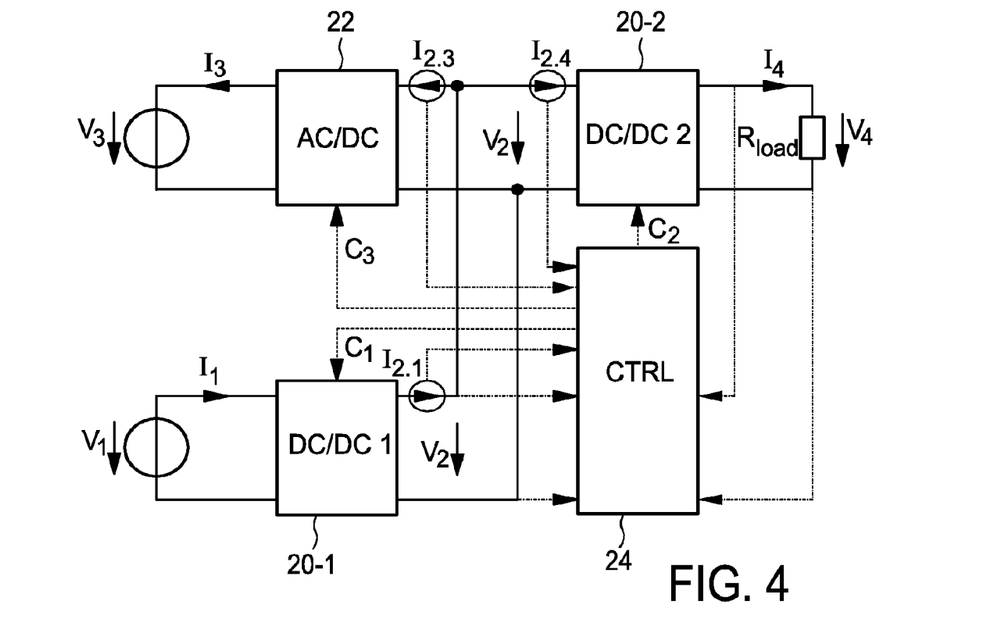
FIG. 4 shows a schematic block diagram of converter apparatus according to an embodiment of the present invention.

FIG. 4 shows a schematic block diagram of a converter apparatus according to the embodiment. The converter system may be implemented as a single chip or as chipset or discrete hardware circuitry on a circuit board. The converter system has a dedicated controller module or controller 24 that measures a DC voltage $V_2$ at an output of a first DC/DC converter (DC/DC 1) 20-1 connected to the output of a non-linear electricity source with DC output voltage $V_1$. The first DC/DC converter 20-1 draws an output current $I_1$ from the non-linear electricity source. Furthermore, the controller 24 measures a DC output current $I_{2,1}$ of the first DC/DC converter 20-1 and derives the resulting output power $P_1=I_{2,1} \times V_2$ of the first DC/DC converter 20-1. Additionally, the controller 24 measures a DC input current $I_{2,4}$ of a second DC/DC converter (DC/DC 2) 20-2 connected to a load $R_{load}$ and derives the resulting input power $P_4=I_{2,4} \times V_2$ of the second DC/DC converter 20-2. In addition, the controller 24 measures the output voltage $V_4$ of the second DC/DC converter 20-2 across the load $R_{load}$. Moreover, the controller 24 measures a DC input current $I_{2,3}$ of a bidirectional AC/DC converter 22 connected to an AC mains with voltage $V_3$ and derives the resulting input power $P_3=I_{2,3} \times V_2$ of the AC/DC converter 22. The output terminals of the first DC/DC converter 20-1 are connected in parallel to the input terminals of the AC/DC converter 22 and the second DC/DC converter 20-2. The measurements are performed by using suitable measurement elements or circuits to derive analog or digital measurement values to be processed by the controller 24.

Based on the measured values, the controller 24 generates three control signals C1-C3 to operate the converter system using the above input variables as well as control functions to control the operation of the first DC/DC converter 20-1 based on the first control signal $C_1$, to control the operation of the second DC/DC converter 20-2 based on the second control signal $C_2$, and to control the operation of the bidirectional AC/DC converter 22 based on the third control signal $C_3$.

Contrary to the above conventional converter system, the proposed converter system according to the embodiment supplies the additional load $R_{load}$ with a regulated DC voltage $V_4$, operates the AC/DC converter 22 as rectifier if $P_4 > P_1$, or operates the AC/DC converter 22 as inverter if $P_4 < P_1$.

To achieve this functionality in the present embodiment, the dedicated controller 24 is adapted to provide three control functions of operating the non-linear electricity source of voltage $V_1$ in its maximum power point, controlling the regulated voltage $V_4$ to supply the local load $R_{load}$ with direct current, and generating a sinusoidal time function of $I_3$ with low harmonic distortion. These control functions are realized with the different power converters 20-1, 20-2 and 22 of the converter architecture of FIG. 4 to maximize power conversion efficiency as function of four operation modes which are described below and summarized in Table 1.

The controller 24 sets the converter architecture into a first operation mode (OM1) if it detects based on the above measured values that $P_1 > P_4$ and $V_1 < V_2 = V_4$. Here, the first DC/DC converter 20-1 is controlled by the first control signal $C_1$ to load the non-linear electricity source such that it generates maximum output power $P_1$. This controlled MPP operation is the first control function. Thus, the first DC/DC converter 20-1 is boosting its input voltage $V_1$ into to a regulated output voltage $V_2$ that is the required input voltage of the DC/AC converter 22 as well as the DC voltage $V_4$. That realizes the second control function. The second DC/DC converter 20-2 is controlled by the second control signal $C_2$ to conduct its input voltage directly to its output without any energy conversion to increase energy efficiency. The non-linear electricity source $V_1$ is generating a power level $P_1$ that is higher than the power level $P_4$ to supply the DC load $R_{load}$ at the output of the second DC/DC converter 20-2. Thus, the AC/DC converter 22 is controlled by the third control signal $C_3$ to operating as an inverter with a controlled input power $P_3=P_1-P_4$ generating a regulated sinusoidal current $I_3>0$ supplied to the sinusoidal voltage source (AC means) with voltage $V_3$. That is the third control function.

The controller 24 sets the converter architecture into a second operation mode (OM2) if it detects based on the above measured values that $P_1 > P_4$ and $V_1 = V_2 > V_4$. Here, the first DC/DC converter 20-1 is controlled by the first control signal $C_1$ to conduct its input voltage $V_1$ direct to its output $V_2$ without any energy conversion to increase energy efficiency. The second DC/DC converter 20-2 is controlled by the second control signal $C_2$ to down-convert input voltage $V_1$ into to a lower controlled output voltage $V_4$. That is the first control function. The non-linear electricity source at voltage $V_1$ is generating a power level $P_1$ that is higher than the power level $P_4$ to supply the DC load $R_{load}$ at the output of the second converter 20-2. Thus, the AC/DC converter is controlled by the third control signal $C_3$ to operate as an inverter operating with a controlled input power $P_3=P_1-P_4$ generating a regulated sinusoidal current $I_3>0$ into sinusoidal voltage source (AC mains) at voltage $V_3$. The control of a sinusoidal time function of $I_3$ is the second control function. The control of power level $P_3=P_1-P_4$ feed into the AC grid with voltage $V_3$ is the third control function. This third control function also realizes the MPP operation of the non-linear electricity source at voltage $V_1$.

The controller 24 sets the converter architecture into a third operation mode (OM3) if it detects based on the above measured values that $P_1 < P_4$ and $V_1 < V_2 = V_4$. Here, the AC/DC converter 22 is controlled by the third control signal $C_3$ to operate as a rectifier generating a controlled DC voltage $V_2 = V_4$ with a sinusoidal current $I_3 < 0$. That is the first and second control function. The second DC/DC converter 20-2 is controlled by the second control signal $C_2$ to conduct its input voltage to its output $V_2 = V_4$ without any energy conversion to increase energy efficiency. The first DC/DC converter 20-1 is controlled by the first control signal $C_1$ to load the non-linear electricity source $V_1$ such that it generates maximum output power $P_1$. The input voltage $V_1$ is thus boosted to the higher DC voltage $V_2$. This regulated MPP operation to maximize power level $P_1$ is the third control function.

The controller 24 sets the converter architecture into a fourth operation mode (OM4) if it detects based on the above measured values that $P_1 < P_4$ and $V_1 = V_2 > V_4$. Here, the AC/DC converter 22 is controlled by the third control signal $C_3$ to operate as a rectifier generating a controlled DC voltage $V_2=V_1$ with a sinusoidal current $I_3<0$. That sinusoidal time function of $I_3$ is the first control function. The amplitude of $I_3$ is regulated such that the rectifier adds a power level $P_3=P_4-P_1$ that can not be provided by the non-linear voltage source at voltage $V_1$. This control function is the second control function that forces the non-linear electricity source to operate at a maximum power point. The first DC/DC converter 20-1 is controlled by the first control signal $C_1$ to conduct its input voltage to its output $V_1=V_2$ without any energy conversion to maximise energy efficiency. Hereby, the voltage $V_1$ is a function of the MPP of the non-linear electricity source that is controlled by the operation of the AC/DC controller 22 which operates as rectifier. The second DC/DC converter 20-2 is controlled by the second control signal $C_2$ to generate a regulated DC voltage $V_4$ from the higher DC input voltage $V_1=V_2$. That is the third control function.

The above first to forth operation modes can be summarized in the following Table 1:

TABLE 1

| | Control functions as function of the operation modes | | | |
|---|---|---|---|---|
| | OM1 | OM2 | OM3 | OM4 |
| | $P_1 > P_4$ | $P_1 > P_4$ | $P_1 < P_4$ | $P_1 < P_4$ |
| | $V_1 < V_2 = V_4$ | $V_1 = V_2 > V_4$ | $V_1 < V_2 = V_4$ | $V_1 = V_2 > V_4$ |
| | 1 electricity source | 1 electricity source | 2 electricity sources | 2 electricity sources |
| Control function | 2 electricity loads | 2 electricity loads | 1 electricity load | 1 electricity load |
| MPP of $V_1$ | DC/DC 1 | AC/DC converter | DC/DC 1 | AC/DC converter |
| $V_4$ | DC/DC 1 | DC/DC 2 | AC/DC converter | DC/DC 2 |
| Time function of $I_3$ | AC/DC converter | AC/DC converter | AC/DC converter | AC/DC converter |

As can be gathered from Table 1, in the first operation mode, the converter system uses one electricity source (i.e. the non-linear DC electricity source) and supplies two electricity loads (i.e. the AC means and the load $R_{load}$), wherein the first DC/DC converter 20-1 is controlled to provide the MPP control function for the non-linear DC electricity source and the voltage regulation function for the output voltage $V_4$ at the load $R_{load}$. The AC/DC converter 22 is controlled to operate as inverter and supplies the AC means with a sinusoidal current $I_3$. Furthermore, in the second operation mode, the converter system uses one electricity source (i.e. the non-linear DC electricity source) and supplies two electricity loads (i.e. the AC means and the load $R_{load}$), wherein the AC/DC converter 22 is controlled to provide the MPP control function for the non-linear DC electricity source and to operate as inverter and supplies the AC means with a sinusoidal current $I_3$, and the second DC/DC converter 20-2 is controlled to provide the voltage regulation function for the output voltage $V_4$ at the load $R_{load}$. Additionally, in the third operation mode, the converter system uses two electricity sources (i.e. the non-linear DC electricity source and the AC means) and supplies one electricity load (i.e. the load $R_{load}$), wherein the first DC/DC converter 20-1 is controlled to provide the MPP control function for the non-linear DC electricity source. The AC/DC converter 22 is controlled to operate as rectifier for the supplied AC current $I_3$ and to provide the voltage regulation function for the output voltage $V_4$ at the load $R_{load}$. Finally, in the fourth operation mode, the converter system uses two electricity sources (i.e. the non-linear DC electricity source and the AC means) and supplies one electricity load (i.e. the load $R_{load}$), wherein the second DC/DC converter 20-2 is controlled to provide the voltage regulation function for the output voltage $V_4$ at the load $R_{load}$. The AC/DC converter 22 is controlled to to provide the MPP control function for the non-linear DC electricity source and to operate as rectifier for the supplied AC current $I_3$.

Figure 5:
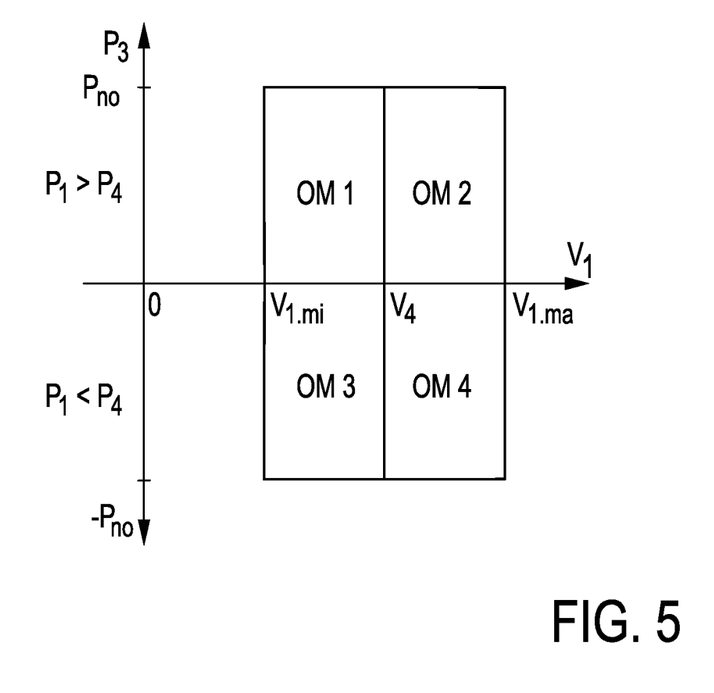
FIG. 5 shows a diagram indicating four operation modes of the converter apparatus according to the embodiment in a state plane.

FIG. 5 shows a diagram indicating the above four operation modes of the embodiment in a state plane within a nominal range between $-P_{nom}$ and $+P_{nom}$ of the input power $P_3$ of the AC/DC converter 22, wherein the first and third operation modes are entered by the controller 24 above a minimum voltage $V_{1,min}$ and the second and fourth operation modes are kept until a maximum voltage $V_{1,max}$ has been reached.

Thus, the proposed power converter system according to the embodiment comprises the bi-directional AC/DC converter 22, the first DC/DC converter 20-1 with the voltage up-conversion function, the second DC/DC converter 20-2 with the voltage down-conversion function and the controller 24 adapted to control the operation of the above three power converters 22, 20-1 and 20-2 as function of measured electrical parameters so that the electric load $R_{load}$ is supplied with a controlled DC voltage and power from the DC electricity source with high priority and with electricity from the AC mains or power supply with lower priority and that one of the two DC/DC converters 20-1, 20-2 is conducting its input directly to its output without energy conversion to maximize the energy efficiency of the converter system. The DC/AC inverter 22 can be used to transfer electricity from the DC electricity source with higher priority into the electric load $R_{load}$ supplied with the controlled DC voltage and with lower priority into the AC mains.

As non-limiting examples, the DC electricity source may be at least one of a single or strings of photovoltaic modules, a fuel cell, an electricity generator powered from wind power, and an electricity generator powered from water power.

Furthermore, as non-limiting examples, the controlled DC voltage may be supplied to light emitting diode (LED) or organic LED (OLED) and/or to electric appliances in buildings with a controlled direct voltage.

The number of control signals is not limited to the above signals C1 to C3. It depends on the number of converters to be controlled by the controller 24. Moreover, the present invention is certainly not limited to the above measured parameters. Other parameters suitable to derive desired control information may be selected and measured.

Other variations to the disclosed embodiments can be understood and effected by those skilled in the art in practicing the claimed invention, from a study of the drawings, the disclosure, and the appended claims. In particular, at least two of the above gesture detection procedures of the first to third embodiments can be combined in a single embodiment to provide various control functions triggered by different gestures.

To summarize, the present invention relates to a power converter architecture and its operation principle that supplies an electric load with a controlled direct voltage from both a local direct current electricity source as well as an AC mains with maximum power conversion efficiency. For the case that the local electricity source can not provide enough electricity to the local load it is additionally supplied with electricity from the AC mains. In other case electricity is also feed into the AC grid when a local source can provide more electricity than needed to supply local loads In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The above processing and/or control steps of the controller 24 of the converter architecture of FIG. 1 can be implemented as program code means of a computer program and/or as dedicated hardware. The related computer program may be stored/distributed on a suitable medium, such as an optical storage medium or a solid-state medium, supplied together with or as part of other hardware, but may also be distributed in other forms, such as via the Internet or other wired or wireless telecommunication systems.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The present invention relates to a power converter architecture and its operation principle that supplies an electric load with a controlled direct voltage from both a local direct current electricity source as well as an alternating current (AC) mains with maximum power conversion efficiency. For the case that the local electricity source can not provide enough electricity to the local load it is additionally supplied with electricity from the AC mains. In other case electricity is also feed into the AC grid when a local source can provide more electricity than needed to supply local loads.

The invention claimed is:

1. An apparatus for controlling a power converter system, the apparatus comprising:
a bi-directional AC/DC converter connected to an AC power supply,
a first DC/DC converter connected to a DC electricity source and having a voltage up-conversion function,
a second DC/DC converter connected to an electric load (Rload) and having a voltage down-conversion function, and
a controller configured to control an operation of said bi-directional AC/DC converter and said first and second DC/DC converters power as function of measured electrical parameters so as to supply said electric load (Rload) with a controlled DC voltage and power from said direct current electricity source via said first and second DC/DC converters with high priority and with electricity from said AC power supply via said AC/DC converter and said second converter with lower priority, wherein one of the first and the second DC/DC converters is controlled to conduct an input directly to an output without energy conversion to maximize energy efficiency of the converter system.

2. The apparatus according to claim 1, wherein said controller is configured to control said first and second DC/DC converters and said AC/DC converter to provide at least one of the following control functions:
operation of said DC electricity source in its maximum power point;
control of a regulated voltage to supply said electric load (Rload) with direct current; and
generation of a sinusoidal time function of an input current to said AC power supply.

3. The apparatus according to claim 1, wherein said controller is configured to set said power converter system into a first operation mode if it detects, based on said measured electrical parameters, that a power level at the output of said first DC/DC converter is higher than a power level at the input of said second DC/DC converter and that an output voltage of said first DC/DC converter is substantially equal to an output voltage at said electric load (Rload), and
wherein during said first operation mode said controller is configured to control said first DC/DC converter so as to load said DC electricity source to generate maximum output power, to control said second DC/DC converter so as to conduct the input directly to the output without energy conversion, and to control said AC/DC converter so as to operate as an inverter.

4. The apparatus according to claim 1, wherein said controller is adapted to set said power converter system into a second operation mode if it detects based on said measured electrical parameters that a power level at the output of said first DC/DC converter is higher than a power level at the input of said second DC/DC converter and that an output voltage of said first DC/DC converter is higher than an output voltage at said electric load (Rload), and
wherein during said second operation mode said controller is configured to control said first DC/DC converter so as to conduct the input directly to the output without energy conversion, to control said second DC/DC converter so as to down-convert the output voltage of said DC electricity source into the output voltage at said electric load (Rload), and to control said AC/DC converter so as to operate as an inverter.

5. The apparatus according to claim 1, wherein said controller is configured to set said power converter system into a third operation mode if it detects based on said measured electrical parameters that a power level at the output of said first DC/DC converter is lower than a power level at the input of said second DC/DC converter and that an output voltage of said first DC/DC converter is substantially equal to an output voltage at said electric load (Rload), and
wherein during said third operation mode said controller is configured to control said first DC/DC converter so as to load said DC electricity source to generate maximum output power, to control said second DC/DC converter so as to conduct the input directly to the output without energy conversion, and to control said AC/DC converter so as to operate as a rectifier.

6. The apparatus according to claim 1, wherein said controller is adapted to set said power converter system into a fourth operation mode if it detects based on said measured electrical parameters that a power level supplied by said DC electricity source is lower than a power level required at said electric load (Rload) and that an output voltage of said first DC/DC converter is higher than the output voltage at said electric load (Rload), and
wherein during said fourth operation mode said controller is adapted to control said first DC/DC converter so as to conduct the input directly to the output without energy conversion, to control said second DC/DC converter so as to generate a regulated output voltage at said electric load (Rload), and to control said AC/DC converter so as to operate as a rectifier.

7. The apparatus according to claim 1, wherein said measured electrical parameters comprise an output voltage and an output current of said first DC/DC converter, an input current and an output voltage of said second DC/DC converter, and an input current of said AC/DC converter.

8. The apparatus according to claim 1, wherein said electric load (Rload) comprises at least one of a light emitting diode, an organic light emitting diode, and electric appliances in buildings.

9. A chip device comprising the apparatus according to claim 1.

10. A power converter system comprising:
- a bi-directional AC/DC converter connected to an AC power supply;
- a first DC/DC converter connected to a DC electricity source and having a voltage up-conversion function;
- a second DC/DC converter connected to an electric load (Rload) and having a voltage down-conversion function; and
- a controller configured to control an operation of said bi-directional AC/DC converter and said first and second DC/DC converters power as function of measured electrical parameters so as to supply said electric load (Rload) with a controlled DC voltage and power from said direct current electricity source via said first and second DC/DC converters with high priority and with electricity from said AC power supply via said AC/DC converter and said second converter with lower priority, wherein one of the first and second DC/DC converters is controlled to conduct an input directly to an output without energy conversion to maximize energy efficiency of the converter system.

11. A chip device comprising the power converter system according to claim 10.

12. A method of controlling a power converter system having a bi-directional AC/DC converter connected to an AC power supply, a first DC/DC converter connected to a DC electricity source and having a voltage up-conversion function, and a second DC/DC converter connected to an electric load (Rload) and having a voltage down-conversion function, said method comprising:
- controlling an operation of said AC/DC converter and said first and second DC/DC converters power as function of measured electrical parameters so as to supply said electric load (Rload) with a controlled DC voltage and power from said direct current electricity source via said first and second DC/DC converters with high priority and with electricity from said AC power supply via said AC/DC converter and said second converter with lower priority, and
- controlling one of the first and the second DC/DC converters to conduct the input directly to the output without energy conversion to maximize energy efficiency of the converter system.

13. A non-transitory, computer-readable storage medium with an executable program stored thereon, where the program instructs a processor to perform steps of method 12.

* * * * *